(12) United States Patent
Gullen

(10) Patent No.: US 10,282,202 B2
(45) Date of Patent: May 7, 2019

(54) IN-EDITOR SPRITESHEETING

(71) Applicant: Scirra Ltd., London (GB)

(72) Inventor: Ashley Gullen, London (GB)

(73) Assignee: Scirra Ltd., London (GB)

( * ) Notice: Subject to any disclaimer, the term of this patent is extended or adjusted under 35 U.S.C. 154(b) by 39 days.

(21) Appl. No.: 15/280,090

(22) Filed: Sep. 29, 2016

(65) Prior Publication Data
US 2018/0088938 A1    Mar. 29, 2018

(51) Int. Cl.
| | | |
|---|---|---|
| *A63F 13/60* | (2014.01) | |
| *G06F 8/77* | (2018.01) | |
| *A63F 13/63* | (2014.01) | |
| *G06F 3/0484* | (2013.01) | |
| *G06F 8/33* | (2018.01) | |
| *G06F 8/71* | (2018.01) | |
| *G06T 11/60* | (2006.01) | |
| *A63F 13/52* | (2014.01) | |

(52) U.S. Cl.
CPC ............... *G06F 8/77* (2013.01); *A63F 13/60* (2014.09); *A63F 13/63* (2014.09); *G06F 3/04845* (2013.01); *G06F 8/33* (2013.01); *G06F 8/71* (2013.01); *G06T 11/60* (2013.01); *A63F 13/52* (2014.09); *A63F 2300/203* (2013.01); *A63F 2300/6607* (2013.01)

(58) Field of Classification Search
None
See application file for complete search history.

(56) References Cited

U.S. PATENT DOCUMENTS

| | | | | |
|---|---|---|---|---|
| 2009/0248831 A1* | 10/2009 | Scott | ................. | G06F 17/30265 709/217 |
| 2011/0306417 A1* | 12/2011 | Sheblak | .................. | A63F 13/10 463/32 |
| 2013/0004073 A1 | 1/2013 | Yamaji et al. | | |

(Continued)

FOREIGN PATENT DOCUMENTS

WO       2009120440 A1    10/2009

OTHER PUBLICATIONS

Freeman, J., Building HTML5 Games with ImpactJS, Feb. 2012, O'Reilly Media, Inc., 1st Edition, pp. 1-140.*

(Continued)

*Primary Examiner* — Said Broome
(74) *Attorney, Agent, or Firm* — Banner & Witcoff, Ltd.

(57) ABSTRACT

Embodiments of the present disclosure aim to improve upon methods and systems for arranging individual images onto a spritesheet in game development software. The arrangement of images is updated in response to user input as the user adds, modifies or deletes images in a development project. Part of the method includes limiting the maximum amount of processing required in response to a user's alteration of an image. From the user side, the user opens a project, which includes an image editor, adds an image to the project/modifies an image in the spritesheet/deletes an image; then commits a change to the image (by clicking "save" or simply closing an edit window); and the user continues editing the project, which might include loading a further image or continuing to work on game code. The project includes one or more spritesheets collections each including one or more spritesheets.

17 Claims, 8 Drawing Sheets

(56) References Cited

U.S. PATENT DOCUMENTS

2013/0286025 A1    10/2013  Spells, III et al.
2014/0002373 A1*  1/2014  Oakley ................ G06F 1/1637
                                                          345/173

OTHER PUBLICATIONS

Marszalkowski et al. "Analysis and Solution of CSS-Sprite Packing Problem", ACM Transactoins on the Web, vol. 10, No. 1 (2015), pp. 1-34.
Jesse Freeman "Building HTML5 Games With ImpactJS", O'Reilly Media, Inc. (2012), pp. 1-63.
European Search Report of EP17193486 dated Feb. 23, 2018.

* cited by examiner

IN-EDITOR SPRITESHEETING

TECHNICAL FIELD

Aspects described herein generally relate to computer graphics, and more specifically to methods and systems for dynamically arranging individual images onto a spritesheet.

BACKGROUND

Computer games often make use of large numbers of bitmap images, such as various backdrop images or individual frames of an animation. Game development tools commonly apply an optimisation where they place multiple individual images on to a single large image without any overlaps. The larger combined image is commonly referred to as a texture atlas or (as in this document) a spritesheet.

Spritesheets are commonly used in the games industry. However, their use typically requires one-off pre- or post-processing steps at either the project load or build points. For example a spritesheet may be prepared, and then imported in its entirety to a game. Alternatively a game may be designed using many individual images, and then arrange these on to spritesheets at build time. Each of these approaches has shortcomings for a game editor that allows the user to make changes and displays their results to them in real-time.

Importing pre-processed spritesheets can be inconvenient to edit. Making an alteration requires changing the source image and then repeating the manual pre-process and import steps. Depending on the tool, further changes may be required to indicate the new locations of images on the spritesheet, or if whole spritesheets were added or removed as a consequence of the change.

Post-processing spritesheets means the editor loses all of the efficiency benefits of spritesheets, because it processes individual images until the user builds the game. This means the editor may use more memory, run more slowly, hit system limits, compress data less efficiently, and take longer to load. It also means the build step must process all of the spritesheets, which can take some time and slow down the user's testing workflow. In some circumstances spritesheets can also render differently to individual images. For example on some graphics hardware mipmaps may be enabled with a POT spritesheet, but not with a NPOT individual image. Therefore stretching an image smaller than its original size could be displayed with a different quality in the editor compared to the built game, which is misleading for the developer.

SUMMARY

Embodiments of the present disclosure aim to improve upon systems for arranging individual images onto a spritesheet in development software, particularly for games. The arrangement of images is updated in response to user input as the user adds, modifies or deletes images in a development project. Part of the method includes limiting the maximum amount of processing required in response to a user's alteration of an image. From the user side, the user opens a project in a software project editor, which includes an image editor, adds an image to the project/modifies an image in the spritesheet/deletes an image; then commits a change to the image (by clicking "save" or simply closing an edit window); and the user continues editing the project, which might include loading a further image or continuing to work on game code. The project includes one or more spritesheet collections each including one or more spritesheets. When the user adds or modifies an image the spritesheet (and spritesheet collection) which include the image are identified, and the spritesheet (and if necessary the collection) is first rebuilt including the newly added/modified image. This requires only the organisation of the image rectangles, and no pixel data is referred to. The process of reordering images also occurs when an image is deleted from the project. The new arrangement of the spritesheet collection is compared to the stored version, and any spritesheets which are different are marked as "needs rendering", while the others remain unchanged. Only when a user attempts to load an image from a spritesheet marked "needs rendering" does the render actually take place. Now when the user finishes editing, only those sheets which need to be rendered form part of the build processing.

According to aspects described herein, there is provided a method comprising: receiving instructions to open a software project, the project comprising one or more spritesheet collections, the spritesheet collections comprising one or more spritesheets; receiving edit instructions relating to a digital image, the instructions received via a software image editor while the project is in an edit mode; and receiving instructions to apply the changes to the digital image; characterised in that the method further comprises, while the project is still in an edit mode: identifying an association between the digital image and a first spritesheet in a first spritesheet collection, automatically updating the arrangement of images in one or more of the spritesheets in the first spritesheet collection to incorporate the changes made to the digital image; marking any updated spritesheets as requiring rendering; and rendering an updated spritesheet when an image contained therein is displayed in the editor. This means that the user is able to edit individual images while working on a project, and frees the user from having to work with entire spritesheets. The demands of processing power are reduced. Further, the user is freed from having to repeat processing or importing steps which make the workflow more cumbersome and slow. This method allows for the benefits of spritesheets to apply within an edit mode of a project, rather than only to the running of a built project Updating the arrangement may comprise using a packing algorithm.

Updating the arrangement may comprise adding a further spritesheet to the first spritesheet collection.

The project may comprise a plurality of spritesheet collections, and the packing algorithm may be restricted to updating the arrangement of images in the spritesheets of the first spritesheet collection. In this way, processing does not enter a runaway situation and have to edit many multiples of spritesheet collections, which would greatly slow down work on a project. The processing is kept streamlined.

Marking an updated spritesheet as requiring rendering may comprise comparing the first spritesheet collection to a pre-existing version of the first spritesheet collection to identify changes.

Receiving edit instructions may include instructions to delete an image, wherein updating the arrangement of images comprises removing the digital image from the first spritesheet Receiving edit instructions may include instructions to create an image, wherein identifying an association comprises adding the digital image to the first spritesheet.

Receiving instructions to apply changes may comprise closing an image edit window.

Rendering the first updated spritesheet may be performed asynchronously with user operation of the software project.

The project may be a game development project.

The method may further comprise detecting a user idle state, and rendering further spritesheets while in the user idle state.

The rendering may be scheduled across different cores of a multi-core processor.

According to some aspects described herein, there is provided a method of automatically maintaining a collection of images within a software game development project, the images being arranged onto one or more spritesheets; the one or more spritesheets being arranged into one or more spritesheet collections, wherein the method comprises: automatically arranging images within a first spritesheet when an image is modified by a user, and marking the first spritesheet as requiring rendering, and rendering the first spritesheet upon a user requesting display of an image within the first spritesheet.

The rendering may be limited to only the spritesheet collection comprising the first spritesheet.

The user request for display of an image may be received while the project is in an edit mode.

According to some aspects described herein, there is provided a method of updating spritesheets in response to user instructions, the spritesheets forming part of a game development project, comprising: receiving instructions to modify an image, the image being associated with a spritesheet, the associated spritesheet comprising digitally compressed image data relating to one or more images; in response to the modify instructions, updating the arrangement of images within the associated spritesheet; the method further comprising, upon receipt of a user request for display of any image contained in the first spritesheet for modifying: creating a decompressed version of the any image contained in the first spritesheet, and displaying the decompressed image.

The instructions to modify the image may be received from an image editor, and displaying the decompressed image may include displaying the decompressed image within an image editor.

A placeholder may be displayed in the image editor while the decompressed image is being created.

The method may further comprise maintaining a cached version of the associated spritesheet, and displaying an unmodified version of the any image contained in the associated spritesheet while the decompressed image is being created.

Methods and systems described herein have at least the following advantages over the prior art:

The user can conveniently edit individual images instead of working with whole spritesheets.

The user never has to repeat the process/import steps after making changes.

The user never has to identify which areas of a spritesheet correspond to images, or be responsible for adding or removing spritesheets.

The benefits of spritesheets apply to the software project editor as well as the built project, including: reduced memory usage of the software project editor, improved runtime performance of the software project editor, the software project editor avoids system limits.

The way the software project editor displays the content to the user is guaranteed to be identical to the way it is displayed after build.

The project build step does not need to arrange spritesheets, since the work was done earlier. This speeds up the testing workflow.

The user never has to wait too long in the software project editor for processing to finish.

The user can continue working in parallel to spritesheets being arranged or rendered.

In short, a user has all the convenience of seeing and working with individual images, but both the software project editor and the built project get all the benefits of using spritesheets.

Further features and advantages will be apparent from the detailed description and appended claims.

BRIEF DESCRIPTION OF THE DRAWINGS

Further features and advantages will become apparent from the following description of an embodiment thereof, presented by way of example only, and by reference to the drawings, wherein like reference numerals refer to like parts, and wherein.

DETAILED DESCRIPTION

Aspects described herein relate to automatic and dynamic methods for arranging spritesheets while a user edits a project within a software program, as well as systems arranged to carry out the methods. This approach includes displaying to the user individual images, and arranging them in to spritesheets automatically as the user makes changes.

Figure 1:
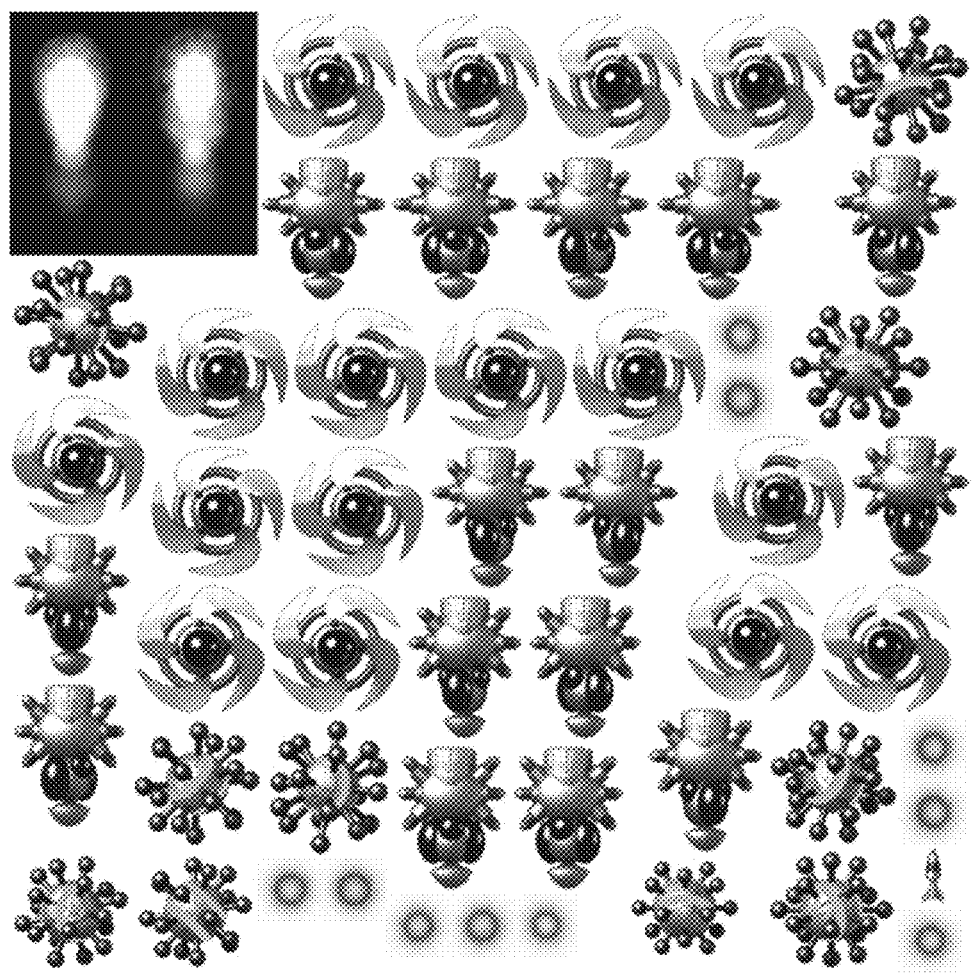
FIG. 1 is a real world example of a spritesheet according to one or more illustrative aspects described herein.

Aspects described herein can, for example, be used to automatically generate graphics for video games. FIG. 1 shows an example spritesheet which contains many individual images from different in-game objects, including animation frames. Spritesheets are used because they are more efficient than handling individual images in several ways. Firstly, memory usage is reduced. There are fewer, larger bitmap images in use so there is less per-image overhead. If the graphics hardware implementing the program requires Power of Two (POT) sizes, this also reduces wasted memory due to having to pad every individual image to a POT size. Secondly, some graphics hardware is less efficient at processing non-Power of Two (NPOT) images. Using a POT spritesheet with NPOT images arranged on it may be more efficient. Some graphics techniques such as mipmaps may require, or work best with, POT images. Further, spritesheets can improve runtime rendering performance, since fewer "change image" commands are necessary (e.g., bindTexture( ) in OpenGL).

System limits can also be avoided for large projects. For example an operating system may have an upper limit of 10000 graphics objects per process. Since each spritesheet only counts as one towards this limit, and may comprise many individual images, their use allows a much higher number of images to be used in practice.

When using compression, as is commonplace where image processing and storage is concerned, the total data size when compressed may be reduced. For example a spritesheet with ten similar images on it may compress to a smaller size than ten individual images, each individually compressed. Finally, spritesheets can improve the loading (or downloading when served over the Internet) time of a project, since processing fewer, larger images commonly has better throughput than many individual images.

There are two phases to the process of generating spritesheets. These are arrangement and rendering. Arrangement requires determining how to pack the image rectangles in to the spritesheet. This determines where images fit according to their size only—no pixel data is referred to. Rendering fills the arranged rectangles on the spritesheet with their pixel data, turning a rectangle layout in to a bitmap image. This step is usually slower since it involves larger amounts of data.

Figure 2:
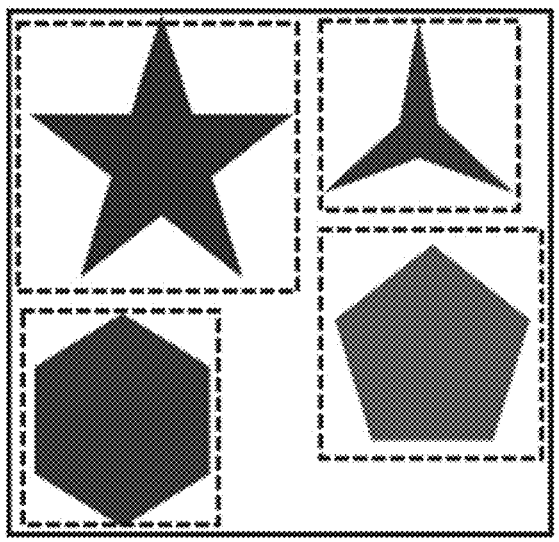
FIG. 2 shows a spritesheet collection incorporating various images forming part of a project according to one or more illustrative aspects described herein.
Figure 2:
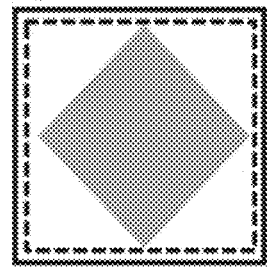

FIG. 2 shows a spritesheet collection of two spritesheets. Any image which is worked upon within a project falling within the techniques described herein is arranged on a spritesheet with other images from the project. The image is associated with a spritesheet, and therefore also with a spritesheet collection. In a spritesheet, images are packed so that they do not overlap.

Figure 3A:
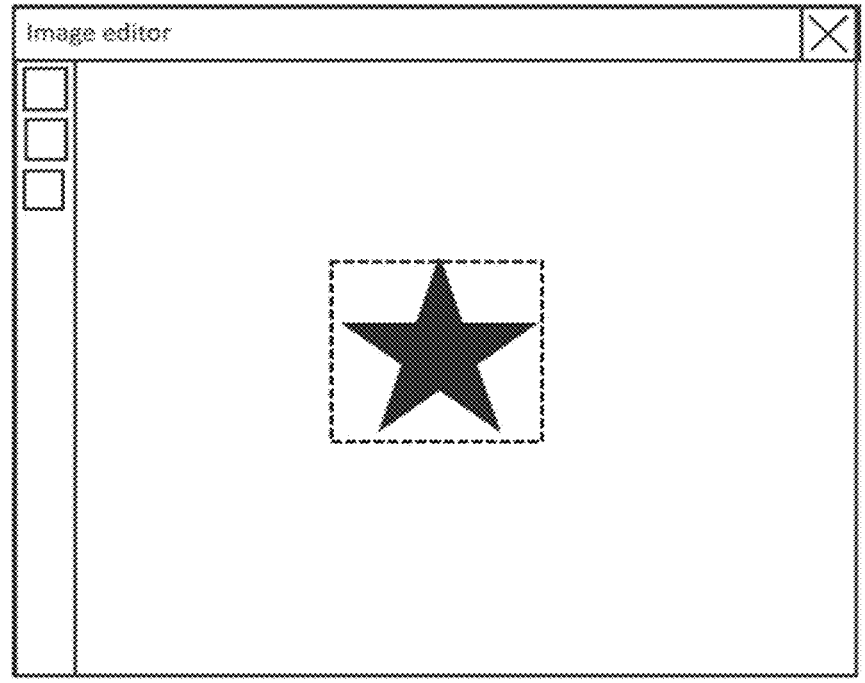
FIGS. 3a and 3b show an image editor in which an image rendered from a spritesheet may be edited according to one or more illustrative aspects described herein.

When the user edits an image, the user is presented with a typical image editor within the same editor designed to edit the individual image, as illustrated by FIG. 3a. Image editing tools such as pen, fill, selection, resize, etc. are available. Only the individual image being edited is shown, not the whole spritesheet. An image showing in the editor is rendered from a sub-set of the spritesheet, which is why the spritesheet must be rendered before it can appear in the editor.

Images are stored in a compressed format (e.g. PNG, JPEG) which is not directly renderable. This prevents images being rendered directly in the editor from their individual data source. This is why the images must be rendered from their spritesheet, since this is the only place where there is decompressed image pixel data that can be rendered. As a consequence, the process of editing an image involves decompressing the image pixel data, allowing the user to change it, and then recompressing it when they finish. This reduces the amount of memory used.

Figure 3B:
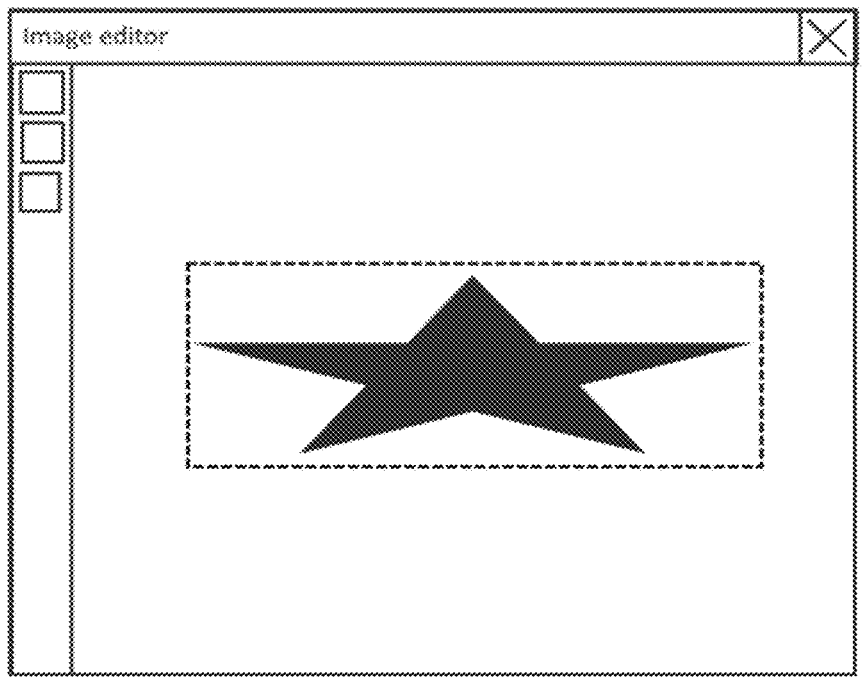

The user has the ability to make changes that affect the spritesheet arrangement shown in FIG. 2. For example the user could edit the image to be a lot wider, so it will no longer fit in the same place on its spritesheet, as shown in FIG. 3b. This modified image obviously no longer fits in the same place on the spritesheet shown in FIG. 2. If the modified image were to still fit in the same place, the image on the spritesheet could be updated in-place.

Once the user applies this change (perhaps simply by closing the editor by clicking the X in the top-right corner), the editor first recompresses the image data (e.g., to PNG or JPEG). Then the editor identifies that this image has changed. It first identifies the spritesheet collection that the image belongs to, which could involve creating a new spritesheet collection. Then it rebuilds the whole spritesheet collection that the image belongs to. A game development project can contain multiple spritesheet collections; by only rebuilding the image's own spritesheet collection, the amount of work to be done is limited. This prevents small changes having to potentially rebuild all the images in the entire project.

The process of the user editing an image which already exists in the project and is part of a spritesheet collection has been described; the process for adding or removing an image is similar: adding an image is the same process but with no prior image, and removing an existing image is the same process but with no subsequent image. If the user adds a new image, the process begins from this point with a new (compressed) image in the spritesheet collection. If the user deleted an image, the process begins from this point with the image removed from the spritesheet collection. Editing an image can be treated as simultaneously removing the old image and adding the modified image.

Once a user has made the changes which are desired, the user applies those changes to the image by closing the edit window, or performing a save command, or similar. The subsequent processing of the spritesheets and spritesheet collections, as well as the underlying image data, is performed in parallel to the user's continued work on the project. The processing may also be scheduled across different CPU cores to make best use of system resources. Until a new spritesheet is ready, if the user wishes to display the modified image in the editor, a placeholder will be displayed. The editor may also have to switch all other images contained on that spritesheet to a placeholder until the new spritesheet is ready. Alternatively the system may cache the old spritesheet until it is no longer needed, in order to keep displaying the unmodified images while a new spritesheet is being prepared.

Figure 4A:
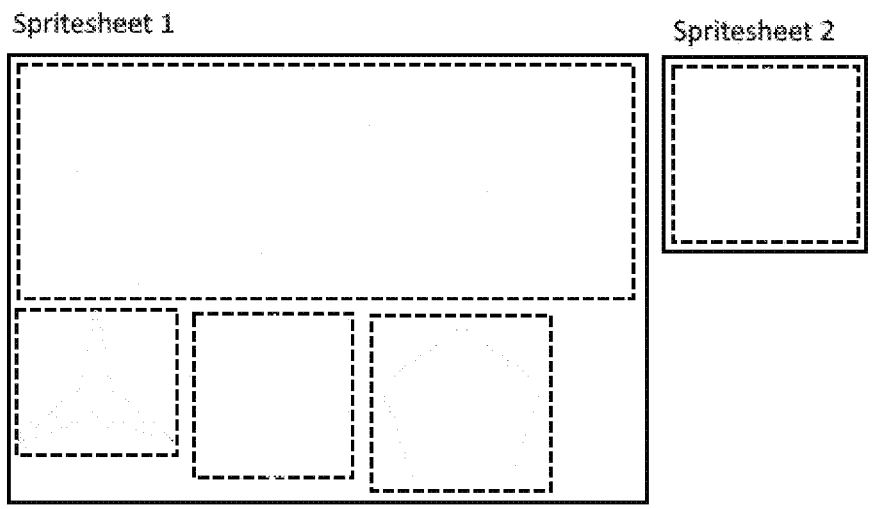
FIG. 4a shows an arrangement of images in a spritesheet collection prior to rendering according to one or more illustrative aspects described herein.

Following the user's instruction to apply the changes, the first phase is to arrange all the image rectangles in to position on a series of spritesheets. No pixel data is written yet, since the processing is dealing at first purely with the geometry of the images. Once the packing algorithm completes, there will be a list of rectangles as represented by FIG. 4.

Note that any non-overlapping rectangle packing algorithm can be used to arrange the images onto the spritesheets and across the spritesheet collection. However it is important to note the algorithm must impose a maximum spritesheet size due to the technical limitations in graphics hardware (which always have a maximum texture size). As a consequence, the algorithm must support "spilling" images over to another spritesheet when they no longer fit on to a spritesheet of the maximum size. Therefore it is essential that a spritesheet collection is able to have one or more spritesheets, since it is not always possible to simply pack all images on to a single large spritesheet. Using multiple smaller spritesheets may also require less memory. It is also preferable to choose a POT size for the spritesheet, so the packing algorithm may restrict the possible spritesheet sizes accordingly.

When the packing algorithm has completed its process, the new set of arranged spritesheets in the modified spritesheet collection is compared to the previous version. In the case of the example shown in FIG. 4a, it can be seen that spritesheet 1 has changed. The wider image is different and has resulted in other images on the same spritesheet being placed in new locations. Therefore the modified spritesheet must replace the old spritesheet. Spritesheet 2 has not changed, so the existing version can be preserved. Since the editor has identified that Spritesheet 2 has not changed, it is ignored from this point on and the remainder of the process only affects Spritesheet 1.

In the spritesheet collection, the changed Spritesheet 1 is replaced with the new one and marked as "needs rendering". If any of the images on the spritesheet are not currently being displayed, the process stops here. This prevents having to do processor intensive rendering work for content which is not visible. As soon as any of the images on the spritesheet which is marked "needs rendering" are displayed, which may be immediately for any content already on-screen, the rendering process begins for that spritesheet. Rendering involves creating a bitmap image for the spritesheet with the individual image bitmaps copied on to it in the locations given by the arranged rectangles. Like with the arranging phase, the rendering phase also happens in parallel to the user continuing to work in the editor, and may be scheduled on different CPU cores to make best use of system resources. Note since images are compressed, rendering them to a spritesheet requires first decompressing them then copying their pixel data in to place on the spritesheet.

In order to allow for seamless editing/repeated edits, cached version of an image's decompressed pixel data may optionally be held. This means that the placeholder display which takes place when a spritesheet containing an image is being rendered can be minimised.

Figure 4B:
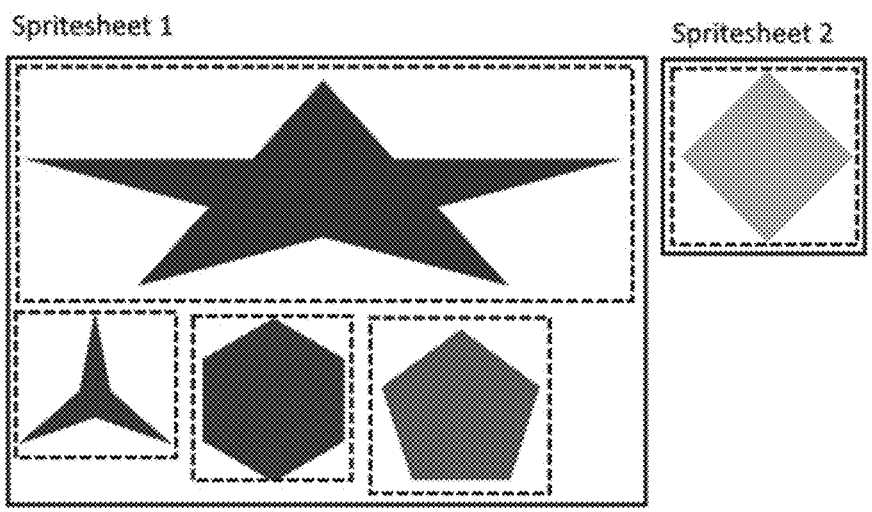
FIG. 4b shows an example updated spritesheet post-rendering according to one or more illustrative aspects described herein.

FIG. 4*b* shows the spritesheet once the rendering process has finished. At this point any placeholder showing for these images in the editor can be updated with the image content again.

As a result of this example process, in which a user has edited an existing image from a spritesheet collection, the user further having one or more of the images from the spritesheet collection open in the image edit window, a single spritesheet collection was re-arranged and a single spritesheet from the project was re-rendered immediately upon the user editing an image. When the new spritesheet was ready, the new results were displayed immediately in the editor so the user could view the results.

Figure 5:
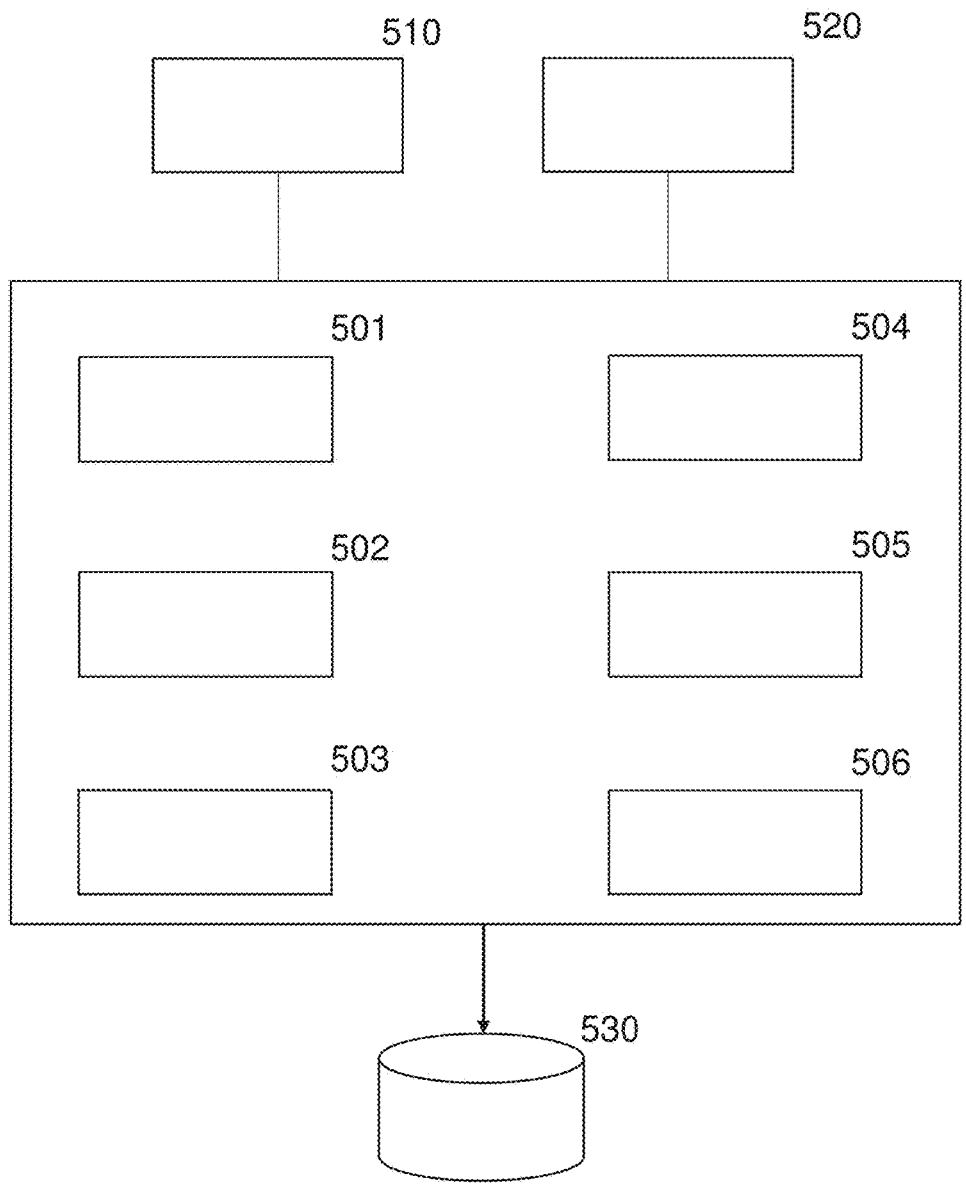
FIG. 5 shows a system diagram according to one or more illustrative aspects described herein.

FIG. 5 shows a system 500 according to one or more illustrative aspects described herein. A computing device 500 comprises a processor 501, and a non-volatile memory 502. Processor 501 may comprise one or more individual processor cores. Image edit module 503 is provided, as is packing module 504, rendering module 505, and project build module 506. The computing device 500 further comprises a display 510 and a user interface 520. The computing device 500 may be a desktop computer, laptop or tablet device or smartphone or other computing device. In some examples the display will be integrated into the computing device. The user interface 620 may be a standard keyboard or mouse arrangement, or may utilise a touch screen where appropriate. Computing device further comprises a spritesheet database 530.

Figure 6:
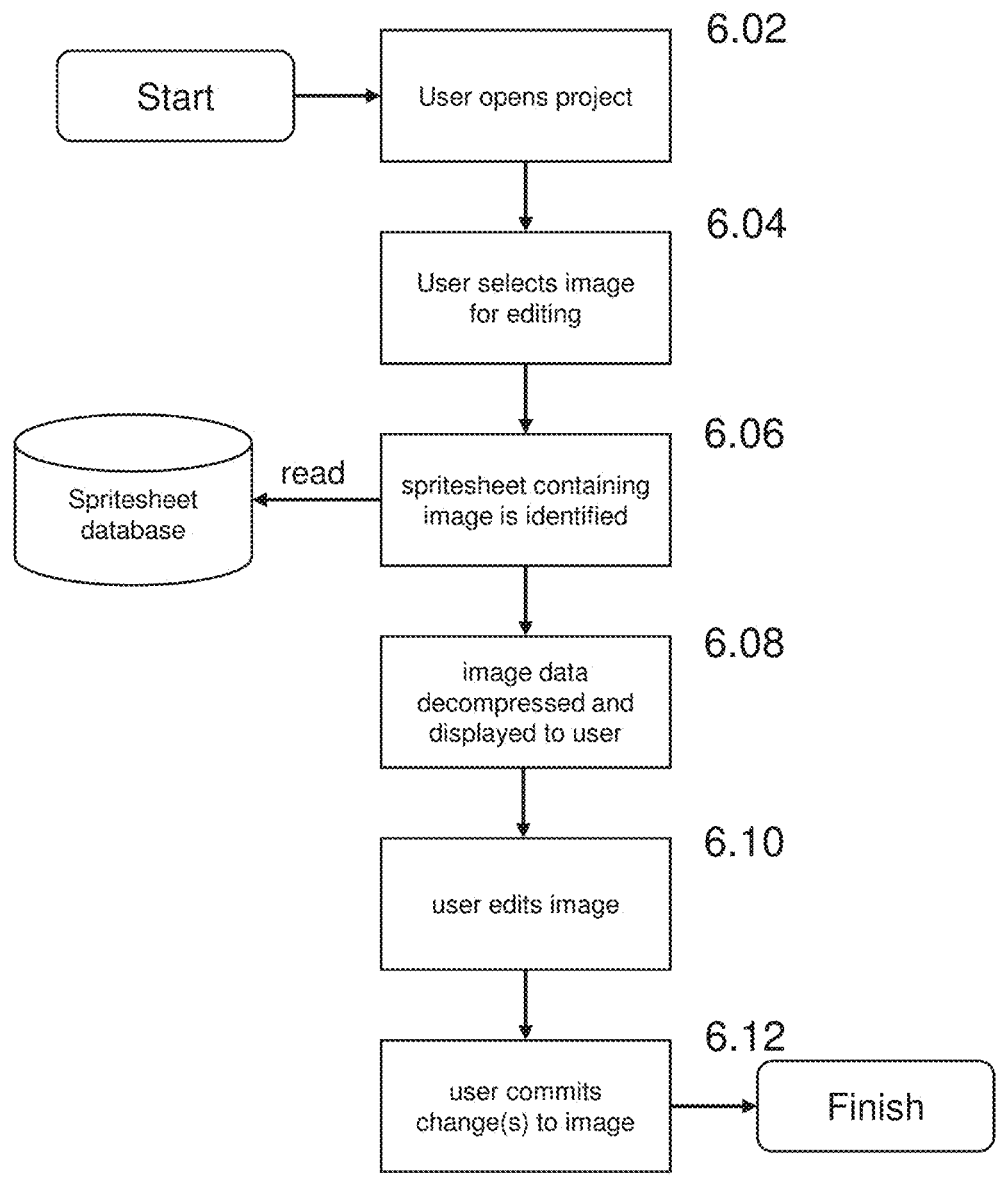
FIG. 6 is a flowchart outlining an example workflow according to one or more illustrative aspects described herein.
Figure 7:
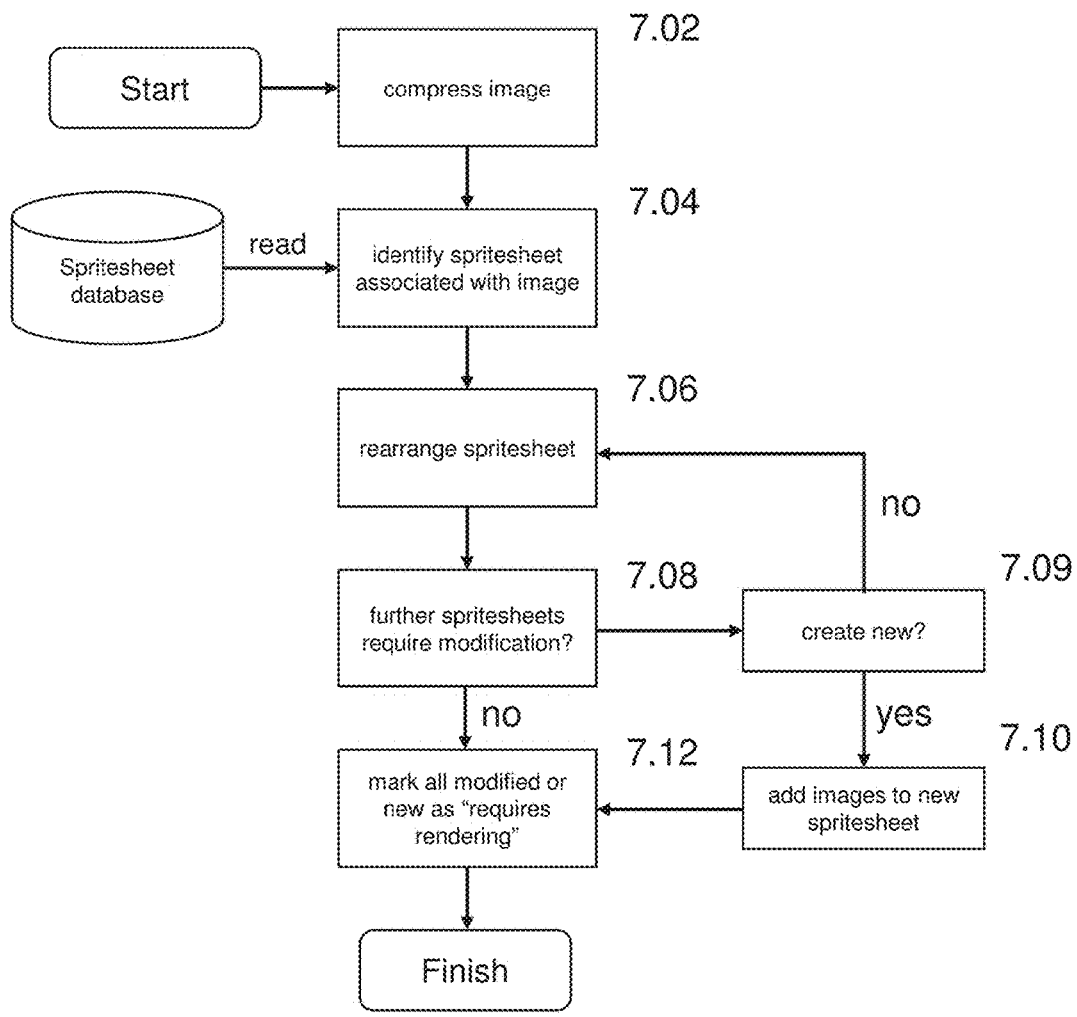
FIG. 7 is a flowchart outlining an example workflow according to one or more illustrative aspects described herein.

FIG. 6 shows a flowchart showing an illustrative process from the point of view of a user. A user opens a project in 6.02, the details of which are displayed on display 510. The project may be a game development project, in which the user constructs the framework of a game which includes rules, instructions and images. In order to display a selected (in step 6.04) project image, the spritesheet in which the image is contained must be rendered. The spritesheet is located in step 6.06 from the spritesheet database 530 and rendered by rendering module 505 in step 6.08. As stated above, an image is rendered from a part of a spritesheet, which contains image data, which is why the spritesheet must be rendered before the image can appear in an image edit window on the display. The user is able to edit the image in step 6.10 using the tools provided by the image edit module described above when in an edit mode. Once finished editing the user commits the changes to the image in step 6.12. This is done while the project remains in edit mode. When an edit mode change is committed, the user can continue to work on the project either by continuing to develop the structure of the project, or by working on further images which are to be displayed. Committing a change may be implemented through closing the image edit window on the display, or saving a project, or other user action. In FIG. 7 a process is outlined which takes place in parallel to a user's continued operation of the project in an edit mode. When the user has committed a change, the image is compressed at step 7.02.

The spritesheet associated with the image is identified from the spritesheet database in step 7.04. In step 7.06 the sprite sheet that has been identified is rearranged using the packing module 504. The packing module 504 utilises a packing algorithm as described above to achieve optimal arrangement of the images in the spritesheet. If the rearrangement of the images on the spritesheet results in an image or images not fitting on the spritesheet, then further spritesheets may require modification. This is identified in step 7.08, and step 7.09 deals with the creation of new spritesheets, where necessary. If a new sheet spritesheet is to be created, this is done at 7.10 and the surplus image or images are added to the new spritesheet. If no new spritesheet is necessary then the further spritesheet into which the surplus image has been inserted is rearranged in 7.06 and then, where no further spritesheets require modification the method proceeds to step 7.12, where all modified or new spritesheets are marked as requiring rendering. The indication that a spritesheet requires rendering is created in metadata relating to the spritesheet. This metadata may, for example form part of the spritesheet data itself, or may be stored in a lookup table relating to the spritesheets.

Figure 8:
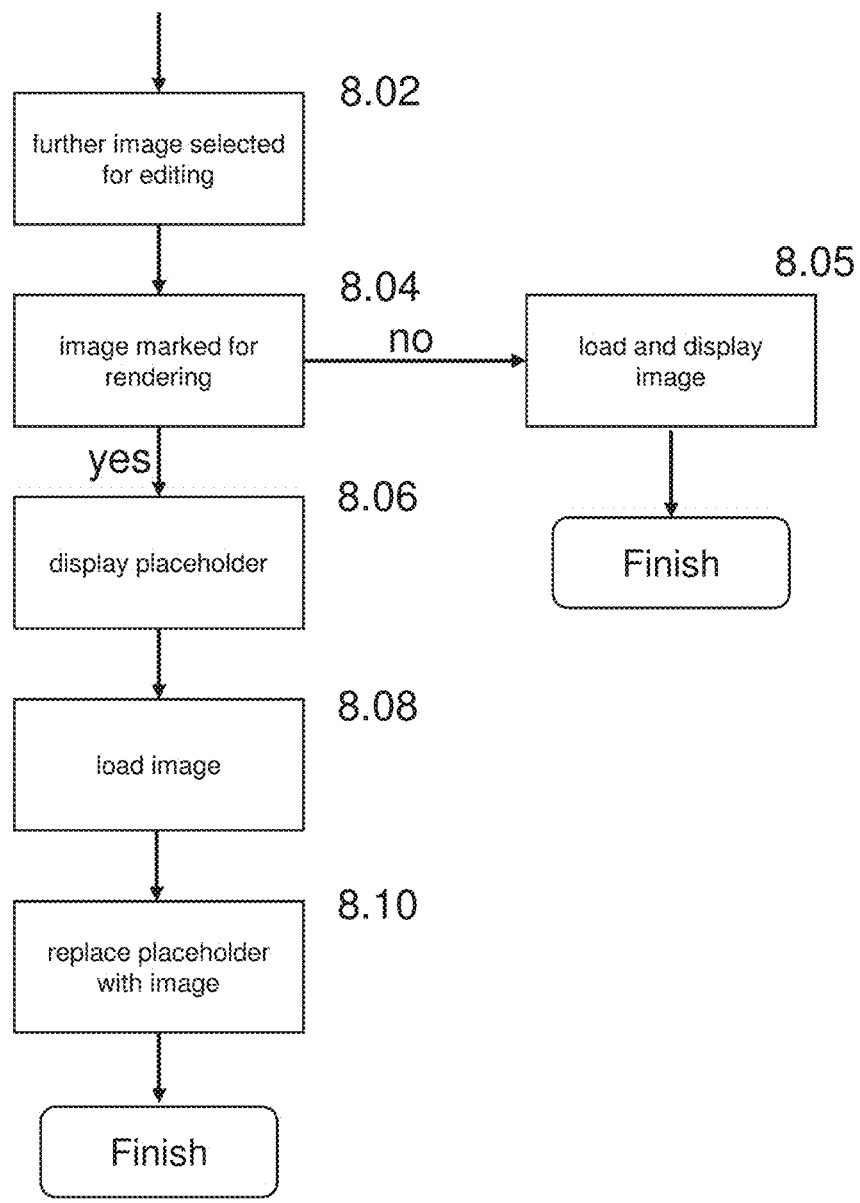
FIG. 8 is a flowchart outlining an example workflow according to one or more illustrative aspects described herein.

FIG. 8 shows the parallel process which takes place while the process of FIG. 7 is in progress. Following from step 6.12, the user may select a further image from the project for editing in step 8.02. The image edit module verifies whether the image is marked as for rendering in step 8.04. If the further image is not part of a spritesheet associated with a previously edited image, then the spritesheet will have been loaded with the project initialisation, and will not be marked for rendering. Therefore the further image can be loaded and displayed directly at step 8.05. If the further image is marked for rendering, a placeholder may be displayed in place of the further image at step 8.06. Rendering module 5.05 proceeds to load and render the further image at 8.08, and once this process is complete the place holder is replaced with the image in step 8.10. In this way, the user works in parallel to the arrangement or rendering of spritesheets, and so the editing workflow is not interrupted to any large extent by the process of using spritesheets.

When a user has finished working on a project, they can instruct the build module to build the project into its runnable form. Since much of the spritesheet rendering work has already been carried out asynchronously as the user has been editing the project, the method described above also shortens the build time of the project. This means that, in the context of a game development project, the testing and quality control workflow is streamlined, and this also leads to improved user experience.

In the process described above, since the user can continue working in the editor while spritesheets are being arranged or rendered, there is the possibility the user can edit the same image again while arrangement or rendering is taking place. Three ways this may be resolved are as follows:

a. Cancel the current arrange/build work and re-start it
b. Wait until the current arrange/build work finishes and then re-start it
c. Prevent any further changes to images which have spritesheets being processed until the work finishes. The editor could for example display an error message to the user if they try, asking them to attempt the edit again when the work finishes, or display a graphical indication to wait, such as a "waiting" spinner.

The "arrangement" phase described above performs arrangement for images within a spritesheet collection. This is to guarantee a maximum scope to the amount of arrangement (and subsequently, rendering) work that must be done in response to a change. This is especially important given that spritesheets are updated immediately upon the user's changes, being committed and the user usually wants to see the result of their changes as soon as possible. Without separate spritesheet collections, the worst-case scenario is that a small change to a large project will cause a "runaway" cascade of changes across all spritesheets, causing a long wait for the user before they see the results of their change.

Further information is now provided regarding spritesheet collections according to one or more illustrative aspects. Spritesheet collections contain a list of individual images that belong to them. These are the set of images that are arranged in to multiple spritesheets, and they cannot be empty (there must be at least one image in a spritesheet collection). The resulting spritesheets also belong to the spritesheet collection. An image can only belong to one spritesheet collection, and the spritesheet containing its pixel data must belong to the same spritesheet collection.

In an illustrative method described herein, there are two possible ways of arranging images in to spritesheet collections.

Firstly, spritesheet collections may include a maximum image count. For example, if the limit is 100, then all the images in a project are separated in to multiple spritesheet collections, each with up to 100 images in it.

Alternatively, a logical grouping may be created based on the organisation of the project. For example, all the animation frames for an animated object may be placed in the same spritesheet collection. This does not necessarily impose a maximum number of images in the collection, but due to the fact that projects generally consist of multiple separate animated objects, this still provides a useful level of separation such that a single change does not cause unrelated objects to have their spritesheets re-arranged. A spritesheet collection may relate to the animation frames of one object only.

These approaches can be combined, e.g., sharing a maximum number of animation frames from related animations in a spritesheet collection.

As the user adds or removes images, it may be necessary to add or remove entire spritesheet collections in order to conform to the given restrictions described above. This can be done in the step where the editor identifies the spritesheet collection for an image.

While the limits imposed on spritesheet collections may occasionally result in less optimal packing than in the case where all images were allowed to be combined on the same set of spritesheets, this is a deliberate limitation in order to prevent the worst-case "runaway" scenario.

Spritesheet collections store individual images in a compressed format (e.g., PNG). Individual images are only decompressed upon the user editing them, or at the point they are rendered to the spritesheet. This is important to reduce the memory usage requirements of the system; otherwise every image's decompressed pixel data would be duplicated—once for the image, and once in the spritesheet.

From the user's perspective, they are working entirely with individual images within the image editor. They see and edit images individually. However the editor will be using spritesheets internally.

When the user makes a change to an image, one or more images in the editor may briefly revert to a placeholder, and then switch back to their updated content after a moment. This is the duration that the arrange and render phases take to complete, during which there is no spritesheet associated with the images showing placeholders.

Although the above describes an automated process, the image editor may still provide an option for the user to review the set of spritesheets it has created. This allows the user to see if any particular images are causing sub-optimal packing according to the packing algorithm in use, or wasting memory. The user is not allowed to manually change the arrangement of any of the spritesheets. This is always done automatically, since in general the user making changes would have little purpose; upon the next change in the same spritesheet collection all their modifications would be thrown away when a new set of spritesheets is arranged automatically.

Since spritesheets are only rendered at the point an image is displayed in the editor (i.e., lazy-loading), the user will find that content loads as it becomes visible in the software. This helps reduce the memory usage, since images that are not viewed are never decompressed.

Upon the user building a project, all spritesheets are forced to be rendered. However this can be mitigated by rendering spritesheets in the background if the user is idle. Alternatively if the user has a regular test cycle which involves regular builds, lazy rendering may still be appropriate. For example if the user tests every 10 minutes or so, but only the first test requires all spritesheets to be rendered, this is still an acceptable workflow. Further, if the user makes changes, only the modified spritesheets need re-rendering upon the next build. Often this is a small enough amount of work to not affect the user's workflow.

Glossary of Terms Used

Editor: the game development software where this method is applied.

Image: in the context of this document, a bitmap image.

Mipmap: a computer graphics technique to improve the performance and quality of images which are displayed smaller than their original size. It works by pre-processing a list of images at ½, ¼, ⅛ . . . size down to one pixel with slow but high-quality processing. Then at runtime these pre-processed smaller images are used if an image is displayed smaller.

NPOT: short for non-power-of-two. See POT.

POT: short for power-of-two, referring to the dimensions of a bitmap image. Each dimension must be expressable as $2^n$, e.g. 32, 64, 128. Due to the way graphics hardware works, images are often most efficient—or required to be—a power-of-two size. NPOT means any image which is not a power-of-two size. For example the sizes 32×32 or 128×64 are POT, but 32×50 or 70×80 are NPOT.

Project: a game development project that a user is developing in the editor.

Spritesheet: a large bitmap image with one or more smaller images arranged on it without overlaps.

Spritesheet collection: a list of one or more spritesheets.

Texture atlas: another term for a spritesheet.

What is claimed is:

1. A method comprising:
opening, on a data processing device, a software project, the project comprising one or more spritesheet collections, each spritesheet collection comprising one or more spritesheets;
editing a digital image via a software image editor executing on the data processing device while the project is in an edit mode; and
receiving instructions to apply changes made to the digital image to at least one spritesheet;
identifying an association between the digital image and a first spritesheet in a first spritesheet collection of the one or more spritesheet collections,
automatically updating an arrangement of images in one or more of the spritesheets in the first spritesheet collection to incorporate the changes made to the digital image;
marking any updated spritesheets as requiring rendering, wherein marking an updated spritesheet as requiring rendering comprises comparing the first spritesheet collection to a pre-existing version of the first spritesheet collection to identify changes; and
rendering an updated spritesheet responsive to an image contained therein being displayed in the software image editor.

2. A method according to claim 1, wherein updating the arrangement comprises using a packing algorithm.

3. A method according to claim 1, wherein updating the arrangement comprises adding a further spritesheet to the first spritesheet collection.

4. A method according to claim 2, wherein the project comprises a plurality of spritesheet collections, and the packing algorithm is restricted to updating the arrangement of images in the spritesheets of the first spritesheet collection.

5. A method according to claim 1, wherein editing the digital image includes deleting the digital image, wherein updating the arrangement of images comprises removing the image from the first spritesheet.

6. A method according to claim 1, where receiving editing the digital image includes instructions to create a new image, wherein identifying an association comprises adding the new image to the first spritesheet.

7. A method according to claim 1, wherein receiving instructions to apply changes comprises closing an image edit window.

8. A method according to claim 1, wherein rendering an updated spritesheet is performed asynchronously with user operation of the software project.

9. A method according to claim 1, wherein the project is a game development project.

10. A method according to claim 1, further comprising detecting a user idle state, and rendering further spritesheets while in the user idle state.

11. A method according to claim 1, wherein the rendering is scheduled across different cores of a multi-core processor.

12. A method of automatically maintaining a collection of images within a software game development project, the images being arranged onto one or more spritesheets, the one or more spritesheets being arranged into one or more spritesheet collections, wherein the method comprises:
automatically arranging, by a processor of a data processing device, images within a first spritesheet when an image from the first spritesheet is modified by a user;
responsive to the arranging, marking the first spritesheet as requiring rendering,
rendering the first spritesheet responsive to a user requesting display of an image within the first spritesheet,
wherein marking the first spritesheet as requiring rendering comprises comparing a first spritesheet collection comprising the first spritesheet to a pre-existing version of the first spritesheet collection to identify changes.

13. The method of claim 12, wherein automatically arranging images is limited to only the spritesheet collection comprising the modified image.

14. The method of claim 12, wherein the user request for display of an image is received while the project is in an edit mode.

15. A method of updating spritesheets in response to user instructions, the spritesheets forming part of a game development project, the method comprising:
modifying, by an image editor executing on a data processing device, an image, the image being part of an associated spritesheet, the associated spritesheet comprising image data relating to one or more images;
in response to the modify instructions, processing the spritesheets, wherein processing the spritesheets comprises:
updating the arrangement of images within the associated spritesheet, and
creating a decompressed version of an image contained in the associated spritesheet, and displaying the decompressed image, upon receipt of a user request for display of the image contained in the associated spritesheet for modifying, wherein displaying the decompressed image includes displaying the decompressed image within the image editor;
maintaining a cached version of the associated spritesheet; and
displaying an unmodified version of any image contained in the associated spritesheet while the spritesheets are being processed.

16. A method according to claim 15, wherein the associated spritesheet is part of a first spritesheet collection, and the arrangement of images of the first spritesheet collection is updated in response to the modify instructions.

17. A method according to claim 15, wherein a placeholder is displayed in the image editor while the spritesheets are being processed.

* * * * *